United States Patent [19]

Matuz

[11] Patent Number: 4,877,130
[45] Date of Patent: Oct. 31, 1989

[54] TAMPER-PROOF JACKET-BOX ASSEMBLY FOR LOAN OR SALE

[76] Inventor: Louis Matuz, 24 rue Bizet, Saint Michel sur Orge, 91240, France

[21] Appl. No.: 202,324

[22] Filed: Jun. 6, 1988

[30] Foreign Application Priority Data

Jun. 24, 1987 [FR] France ................................ 87 08886
Sep. 30, 1987 [FR] France ................................ 87 13503

[51] Int. Cl.⁴ .......................................... B65D 85/57
[52] U.S. Cl. ..................................... 206/309; 206/807
[58] Field of Search ............... 206/309, 311, 312, 313, 206/444, 807, 105, 382

[56] References Cited

U.S. PATENT DOCUMENTS

| | | | |
|---|---|---|---|
| 4,101,027 | 7/1978 | Kohl et al. ........................... | 206/309 |
| 4,365,708 | 12/1982 | Tyus ..................................... | 206/309 |
| 4,566,590 | 1/1986 | Manning et al. ................. | 206/312 X |
| 4,589,549 | 5/1986 | Hehn ................................. | 206/1.5 X |
| 4,620,630 | 11/1986 | Moss ................................ | 206/313 X |
| 4,640,413 | 2/1987 | Kaplan et al. .................. | 206/312 X |

FOREIGN PATENT DOCUMENTS 2050964 5/1971 Fed. Rep. of Germany ...... 206/313

Primary Examiner—John Rivell
Attorney, Agent, or Firm—Kramer, Brufsky & Cifelli

[57] ABSTRACT

A tamper-proof box assembly for storing compact discs is disclosed. The compact disc jacket assembly has at least two jackets, a first of which is adapted to hold an information card and a second of which is adapted to hold a compact disc. The box encloses the second of the jackets while enabling access to the information card in the first of the jackets from outside of the box. A sliding cover opens and closes the box and is locked into position by a metal locking strip disposed between the box and the sliding cover.

9 Claims, 4 Drawing Sheets

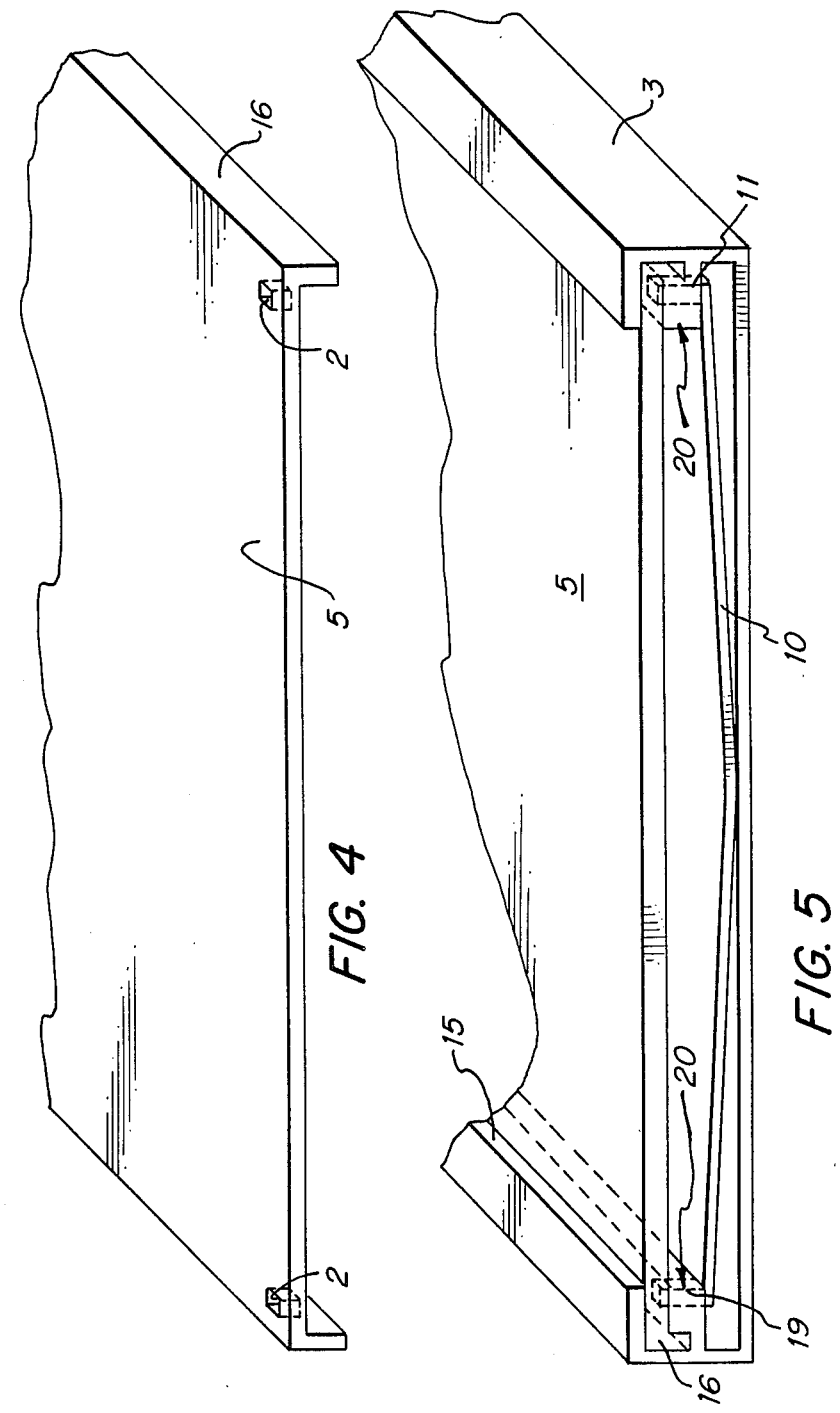

TAMPER-PROOF JACKET-BOX ASSEMBLY FOR LOAN OR SALE

DESCRIPTIVE SUMMARY

The present invention relates to a tamper-proof box containing the part of the jacket holding one or several compact disks, for example, the part of the jacket containing the booklet being accessible from the outside of the box.

As shown in FIG. 3, the invention is characterized by a box (4) closed by a lockable sliding cover (5). This box holds the compact disk, contained in jackets (1) which are welded to an outer flap containing the booklet (7).

The present invention is used in the disk lending industry.

The present invention relates to an assembly consisting of a box provided with a tamper-proof cover containing a jacket holding the compact disks. This jacket is welded to a double flexible flap which contains the booklet providing a description of the musical or audio work recorded on a compact disk.

Besides the booklet, the jacket is provided with flexible sleeves designed to accommodate the health card or lending card.

A customer who wishes to borrow a compact disk reviews the booklet to find out what is on the disk, and if he wants it, obtains it from the renter. To gain access to the compact disk, the renter unlocks the cover of the box to take out the disk-booklet assembly.

There are a number of lending arrangements or systems currently available, specifically for written works. These systems are installed in libraries and are consulted by patrons who wish to borrow. A patron who decides to make such a transaction exchanges the card identifying the work for the work itself through a rental agreement. This arrangement is easily adaptable to books since the latter can first be examined visually. It can be applied to conventional phonograph records only when the records are identified in their entirety, but it becomes difficult to adapt to compact disks, whose vast contents are always complex, broken down into uniform or diversified chapters. These disks usually contain an entire body of work involving one or several authors and are designed to provide several hours of continuous listening time. Furthermore, these laser-read compact disks are fragile and extremely valuable. They cannot be made available to the public at large without the risk of rapid deterioration of the disks. To limit handling, compact disks are accompanied by booklets describing the work or works recorded. Finally, lending entails the risk of theft or bootlegging; to avoid these risks, some arrangement must be devised which would prevent the disk from being borrowed without supervision by the rental or monitoring service.

The purpose of the present invention is to propose a "tamper-proof Jacket-Box" assembly "for the lending of compact disks," characterized by the fact that it includes a flap-equipped flexible plastic jacket containing a sufficient number of sleeves to hold the compact disks, the rental card and the descriptive booklet, and a rigid box closed by a lockable sliding cover, the compact disk being kept in the box and it being possible to consult the flexible booklet from the outside.

The present invention so defined offers a number of advantages, especially:
very low production cost,
ease of implementation,
protection against theft or any type of deterioration,
rapid identification of the contents of the disk.

The present invention so defined will be better understood on the basis of the attached drawings, which are provided non-restrictively and solely by way of indication, especially as regards the nature of the materials and the shape selected.

FIGS. 4 and 5 are cross sections of the cover and the case provided with the metal strip in locked position.

Figure 1:
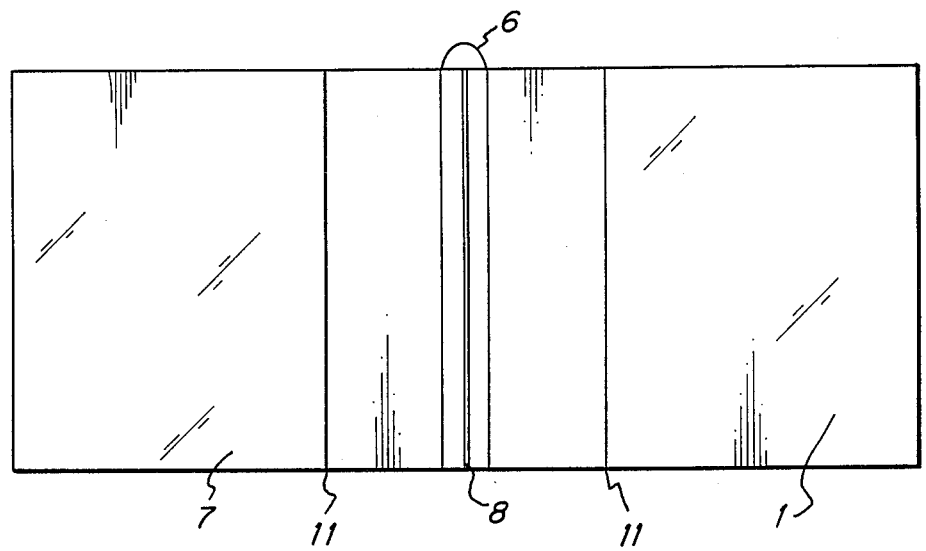
FIGS. 1 and 2 show the flexible jacket containing the booklet and the sleeves which keep the compact disks protected.

According to an important characteristic of the invention, FIG. 1 shows the jacket opened to its first flap. This jacket consists of an external part which does not enter the box, and an internal part which contains the sleeves with the disks and is housed in the box. The outer jacket, in our example, is 180 mm long and 160 mm wide. It is constructed of translucent polyvinyl chloride film 150 microns thick, welded by means of a high-frequency weld (8). The plastic backing (6) joins the jacket containing the booklet (7), the compact-disk sleeves (1), the identification card and the health card, also contained in sleeves. The flexible plastic backing, which is about 20 mm wide, consists of a continuous weld (8) joining the jacket and the sleeves. The booklet (7) contains the documents describing or characterizing the work recorded on the proposed compact disk. It is glued into one of the flexible polyvinyl chloride sleeves opened at level (11).

Figure 2:
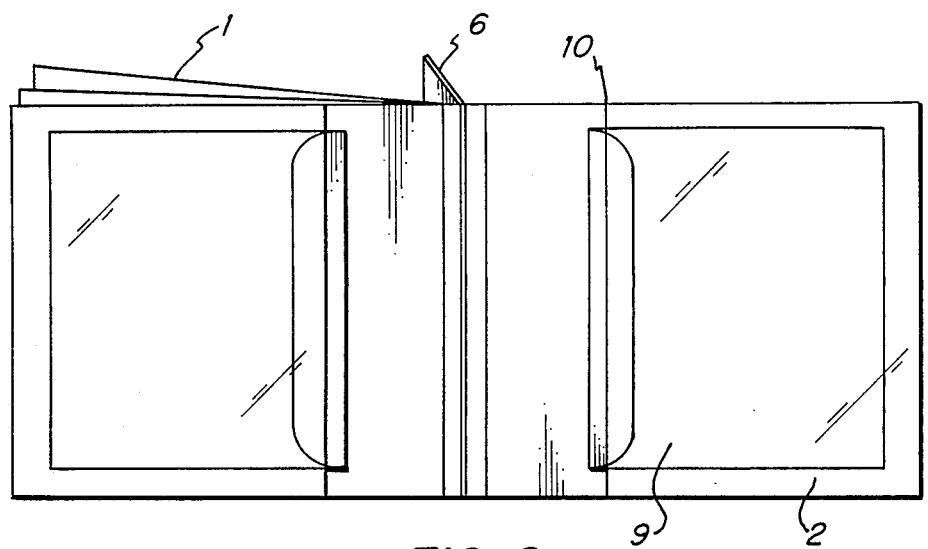

According to another characteristic of the invention, FIG. 2 shows the individual sleeves (1) opening at level (10). These sleeves, a sufficient number of which is provided, contain the antidust bags (9) that protect the compact disks. These disks, inserted in their jackets (9), are made available to the borrower when he establishes a rental agreement, after consulting the descriptive booklet (7). The disks and bags are inserted in their jackets (9) and placed inside a lockable box, while the part of the jacket containing the booklet emerges from this box and can be consulted freely.

Figure 3:
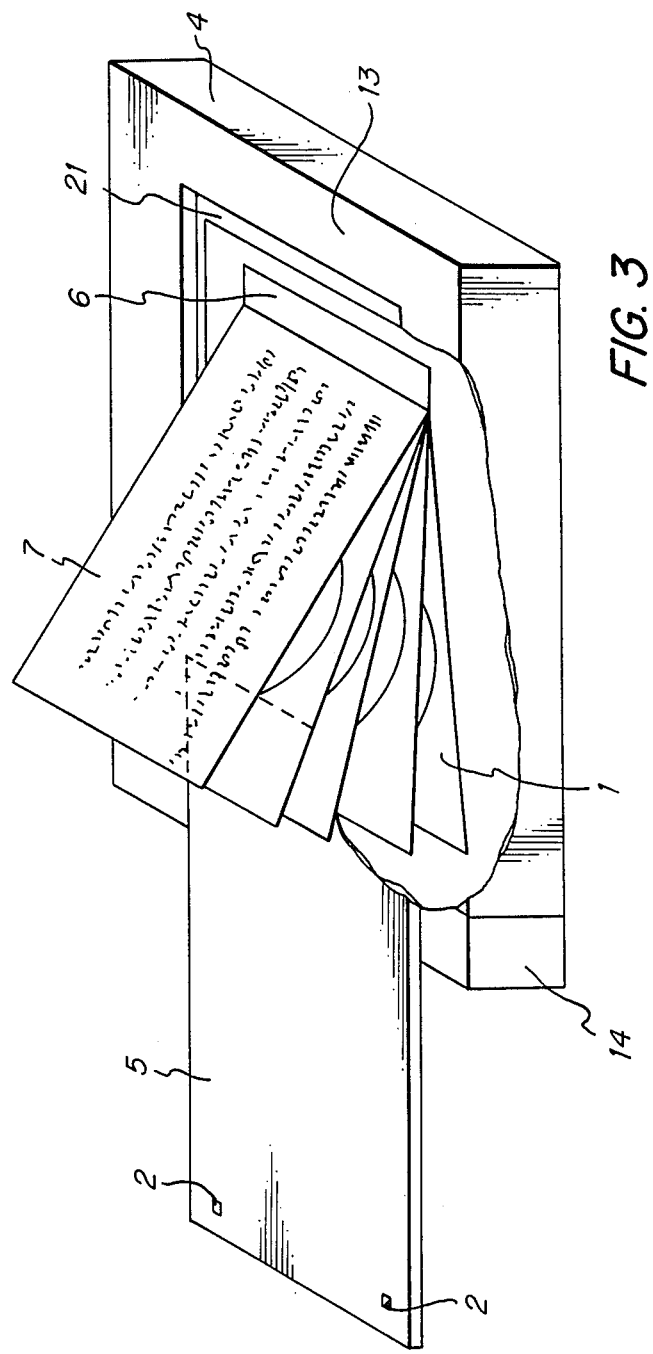
FIG. 3 shows the box designed to contain the flexible jacket.

In an important characteristic of the invention, FIG. 3 shows the box designed to contain the flexible jacket and its disks. This figure shows the complete jacket-box assembly in a partially exploded view. The box (4) is closed partway by the sliding cover (5). The part of the jacket which includes the sleeves (1) containing the compact disks is slid into the box, while the sleeve containing the booklet (7) remains outside the box. The booklet (7) and the sleeves (1) are joined at the backing (6), which is concealed inside the box when the cover (5) is slid shut to close the box (4). The lock for the cover at level (2) allows a sufficient gap to be left by the cover at level (21) so that the flexible backing (6) can be withdrawn but it is not possible to remove the compact disks.

In FIG. 4 the sliding cover (5) is made of non-magnetic molded plastic. The side edges are curved (16) to enable them to slide in the groove on the cover. Openings (2) have been machined into the top of the cover to accommodate the locking pins.

In FIG. 5 the cover (5) is locked onto the case (3). The edges of the cover (16) are protected by the flanges

(15) of the case. The flanges (15) and the rails (20) of the case form a groove in which the cover (5), indicated as number (17) in FIG. 6, travels. Openings (19) have been made in the ends of the rails (20).

In the locked positon shown in FIG. 5, the openings (19) in the rails (20) and the openings (2) in the sliding cover are lined up so that the pins (11) on the metal strip will pass through them.

Figure 6:
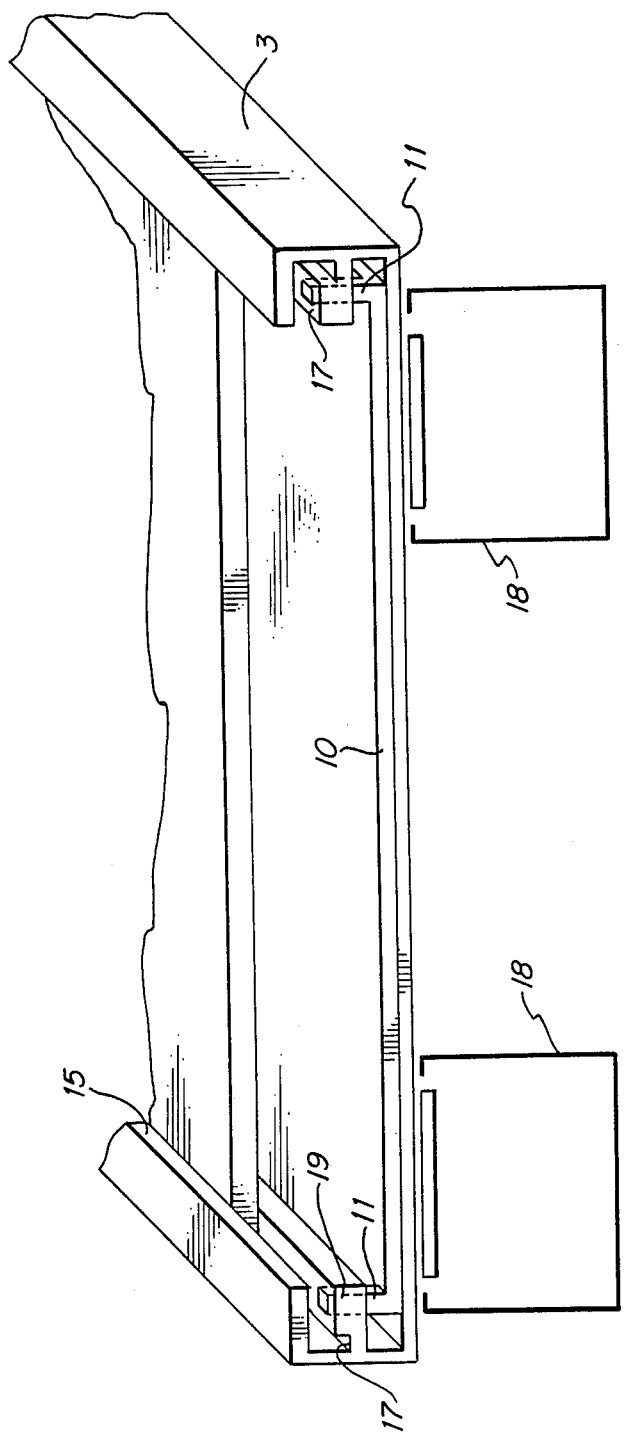
FIG. 6 is a cross section of the cover and the case in unlocked position.

FIG. 6 shows the cover (5) unlocked from the case. To unlock the cover, two electromagnets (18) were used to straighten the metal strip (10) bearing the pins (11). When these pins dropped they released the cover (5) by coming out of the openings (2) in this cover. This movement reveals the groove (17) in which the flange (16) of the cover travels.

A metal strip with pins (11) whose length matches the thickness of the case can be used. The electromagnetic device (18) used is placed near the store's check-out counter and is available for use by the renter or seller. The latter performs the unlocking procedure, takes out the article or disk out of the case, and hands it over to the customer when the transaction is completed.

The case is also provided with an alarm detector so that it cannot be stolen or taken out of the store without setting off an alarm.

I claim:

1. A tamper-proof box assembly adapted for storing compact discs, comprising:
   a compact disc jacket assembly having at least two sleeves, a first of said sleeves adapted to hold an information card and a second of said sleeves adapted to hold a compact disc;
   box means for enclosing at least the second of said sleeves therein;
   a sliding cover for closing and opening said box means;
   lock means disposed between said box means and said sliding cover for locking the sliding cover to close the box means, said locking means incorporating a metal locking strip between the box means and the sliding cover.

2. The tamper proof box assembly of claim 1 wherein said sliding cover closes said box means so as to leave a sufficient gap between the box means and the cover to enable the first of said sleeves to protrude from the box means.

3. The tamper proof box assembly of claim 2 wherein said sliding cover includes at least one opening therethrough; and
   lock means includes at least one pin on said metal strip for insertion into said at least one opening when the sliding cover closes the box means.

4. The tamper proof box assembly of claim 3 wherein said lock means further includes an external electromagnet for positioning the metal strip such that the pin is withdrawn from the opening through the sliding cover to release the cover whereby the cover can be withdrawn from the box means.

5. The tamper proof box assembly of claim 4 wherein said metal strip includes a pin projecting from either end thereof.

6. The tamper proof box assembly of claim 5 wherein said box means includes rail means along the inner walls of said box means for slidingly receiving said cover, said rail means further including slots for receiving the pins on said metal strip.

7. The tamper proof box assembly of claim 6 wherein said jacket assembly includes a flap-equipped flexible plastic jacket having a plastic backing joining said at least two sleeves.

8. The tamper-proof box assembly of claim 7 wherein the jacket assembly and the sleeves are made of a transparent, flexible polyvinyl film.

9. The tamper-proof box assembly of claim 6 wherein said metal strip is curved so that said pins are normally biased into the slots in the rail means.

* * * * *